United States Patent [19]

Takayama et al.

[11] Patent Number: 4,964,841

[45] Date of Patent: Oct. 23, 1990

[54] CONTINUOUSLY VARIABLE TRANSMISSION

[75] Inventors: Mitsunao Takayama; Takeshi Nakazawa; Kozo Yamauchi; Atsushi Asano, all of Nagoya, Japan

[73] Assignee: 501 Aichi Kikai Kogyo Kabushiki Kaisha, Nagoya, Japan

[21] Appl. No.: 378,084

[22] Filed: Jul. 11, 1989

[51] Int. Cl.$^5$ .............................................. F16H 11/02
[52] U.S. Cl. ........................................ 474/11; 474/27
[58] Field of Search ................... 474/8, 11, 12, 17, 18, 474/19, 13, 20, 25-28, 69, 70

[56] References Cited

FOREIGN PATENT DOCUMENTS

| 0013854 | 1/1987 | Japan | 474/11 |
| 0013856 | 1/1987 | Japan | 474/11 |
| 0159847 | 7/1987 | Japan | 474/11 |

Primary Examiner—Thuy M. Bui
Attorney, Agent, or Firm—Dennison, Meserole, Pollack & Scheiner

[57] ABSTRACT

A continuously variable transmission is provided with a driving pulley comprising a stationary half pulley fixed to a driving shaft and a movable half pulley, and a driven pulley comprising a stationary half pulley fixed to a driven shaft and a movable half pulley. A V-groove is formed between the stationary half pulley and the movable half pulley and adjustable by moving the movable half pulley in the axial direction in each of the driving pulley and the driven pulley. An endless belt is wrapped to each V-groove, and rotation of the driving shaft is transmitted to the driven shaft steplessly. A slider gear disposed in the axial direction is connected one or both half pulleys of the driving pulley, and is threadedly engaged with a slider shaft and driven by a driving source and moved forward or rearward in the axial direction on the slider shaft, so that one or both half pulleys are moved forward or rearward in the axial direction and the distance between both half pulleys is adjusted. A new combination of the control system and drive mechanism provides improved performance.

4 Claims, 4 Drawing Sheets

CONTINUOUSLY VARIABLE TRANSMISSION

BACKGROUND OF THE INVENTION

1. Field of the Invention

The present invention relates to pulleys in a continuously variable transmission applied mainly to vehicles such as an automobile, a motorcycle or the like.

2. Description of the Prior Art

In general, a continuously variable transmission is composed of a pair of opposite half pulleys with inner surface in taper form, and one or both half pulleys are made movable in the axial direction thereby distance between both half pulleys can be adjusted, and a belt hung to the pulley is moved upward or downward by wedge effect due to taper form of the inner surface of the half pulleys when the distance between both half pulleys is varied so that effective radius of the pulley is adjusted and the rotating speed ratio to other pulley connected to the pulley through the belt is adjusted continuously.

In the prior art, in such speed change mechanism, the half pulleys are moved in the axial direction by means of oil pressure or centrifugal force.

However, according to oil pressure, hydraulic control mechanism such as a hydraulic pump, a pressure adjusting valve or the like is required thereby the structure is complicated and expensive, and working failure may occur due to oil leakage. Also according to centrifugal force, fine adjustment of centrifugal force is very difficult and moreover generation of constant centrifugal force is also very difficult thereby the working becomes rough and unstable.

In a transmission in the prior art, when motion to narrow the distance between both half pulleys is performed at the main drive side, since the speed change is performed at the state that effective tension always acts on an endless belt, problem occurs in that the power transmission efficiency is deteriorated or breakage of the endless belt becomes hard. That is, force required for transmission of the endless belt becomes sum of belt thrust in an input pulley and an output pulley (thrust force in the axial direction for clamping so that the endless belt and the input and output pulleys do not slip), and force of pushing-out the endless belt at the output side towards the outside and force of pushing-in the endless belt at the input side towards the inside, thereby considerable transmission loss is produced.

Further in a continuously variable transmission in the prior art, if an endless belt of narrow V-angle having high friction coefficient is used, excessive tension acts on the endless belt at sudden transmission thereby problem occurs in that the endless belt is pushed to the input and output pulleys and may bite them.

A continuously variable transmission is provided with a mechanism of transmitting the rotating force to both the outer rotary shaft and the inner rotary shaft being mutually slidable.

Such rotating force transmitting mechanism in the prior art, as shown in FIG. 7, comprises a cylindrical outer rotary shaft 61 and an inner rotary shaft 62 which is inserted in the outer rotary shaft 61 in relatively slidable state. The outer rotary shaft 61 is provided with a key way 63 in the axial direction and the inner rotary shaft 62 is provided with a key 64, and the key 64 is fitted to the key way 63. For example, when the inner rotary shaft 62 is made a driving shaft and the outer rotary shaft 61 is made a driven shaft, the rotating force of the inner rotary shaft 62 is transmitted through the key 64 and the key way 63 to the outer rotary shaft 61.

The above-mentioned constitution in the prior art is disadvantageous in that relative slide resistance between the outer rotary shaft 61 and the inner rotary shaft 62 becomes large due to friction produced between the key 64 and the key way 63.

SUMMARY OF THE INVENTION

An object of the invention is to provide a continuously variable transmission wherein distance between both half pulleys can be adjusted finely and stably by simple and lightweight constitution, and the optimum transmission state can be produced corresponding to any operation state.

Another object of the invention is to provide a continuously variable transmission wherein transmission is performed while speed of widening distance between both half pulleys of the input pulley during transmission is held to such speed that effective tension for the endless belt is not produced.

Still another object of the invention is to provide a continuously variable transmission wherein although a small motor is adopted high-speed transmission is possible.

A continuously variable transmission according to a first embodiment of the invention is provided with a driving pulley comprising a stationary half pulley having a conical surface and fixed to a driving shaft, and a movable half pulley having a conical surface similar to that of the stationary half pulley and forming a V-groove with the stationary half pulley and installed movable in the axial direction of the driving shaft and moved in the direction away from the stationary half pulley by a moving means; a driven pulley comprising a stationary half pulley having a conical surface and fixed to a driven shaft, and a movable half pulley having a conical surface similar to that of the stationary half pulley and forming a V-groove with the stationary half pulley and installed movable in the axial direction of the driven shaft and moved in the direction away from the stationary half pulley by a moving means; and an endless belt wrapped to each V-groove of the driving pulley and the driven pulley, rotation of the driving shaft being transmitted to the driven shaft in continuous transmission, wherein a slider gear disposed in the axial direction is connected to one or both half pulleys of the driving pulley, and is threadedly engaged with a slider shaft and driven by a driving source and moved forward or rearward in the axial direction on the slider shaft, thus one or both half pulleys are moved forward or rearward in the axial direction thereby the distance between both half pulleys is adjusted.

A second embodiment is provided in the continuously variable transmission of the first embodiment with means for widening the distance between both half pulleys of the driving pulley during transmission at such speed that effective tension does not act on the endless belt.

A third embodiment is provided with a moving means of the movable half pulley at the driving pulley side or the driven pulley side in the continuously variable transmission of the first embodiment, comprising a slider shaft fixedly installed along the outer circumference of the shaft at the opposite side to the conical surface of the movable half pulley and having a male screw being a multiple thread screw on the outer circumferential surface, a slider gear having a female screw being a multiple thread screw threadably engaged with the male screw of the slider shaft on the inner circumferential surface, the slider gear being capable of threadably advanced on the slider shaft and opposed in abutting state to the surface at the opposite side of the conical surface of the movable half pulley through a bearing, and a slider gear driving means meshed with the outer circumferential edge of the slider gear, wherein the slider gear is rotated by drive of the slider gear driving means thereby the slider gear is moved on the slider shaft and the movable half pulley can be moved in the direction away from the stationary half pulley.

A fourth embodiment is a rotating force transmitting mechanism comprising an outer rotary shaft and an inner rotary shaft being relatively movable, wherein the outer rotary shaft is provided with a key way in the axial direction or a key being rotatable about axis perpendicular to the axial direction, and the inner rotary shaft is provided with a key being fitted to the key way and rotatable about axis perpendicular to the rotating axial direction or a key way in the axial direction to which the key is fitted.

DESCRIPTION OF THE PREFERRED EMBODIMENTS

Figure 1:
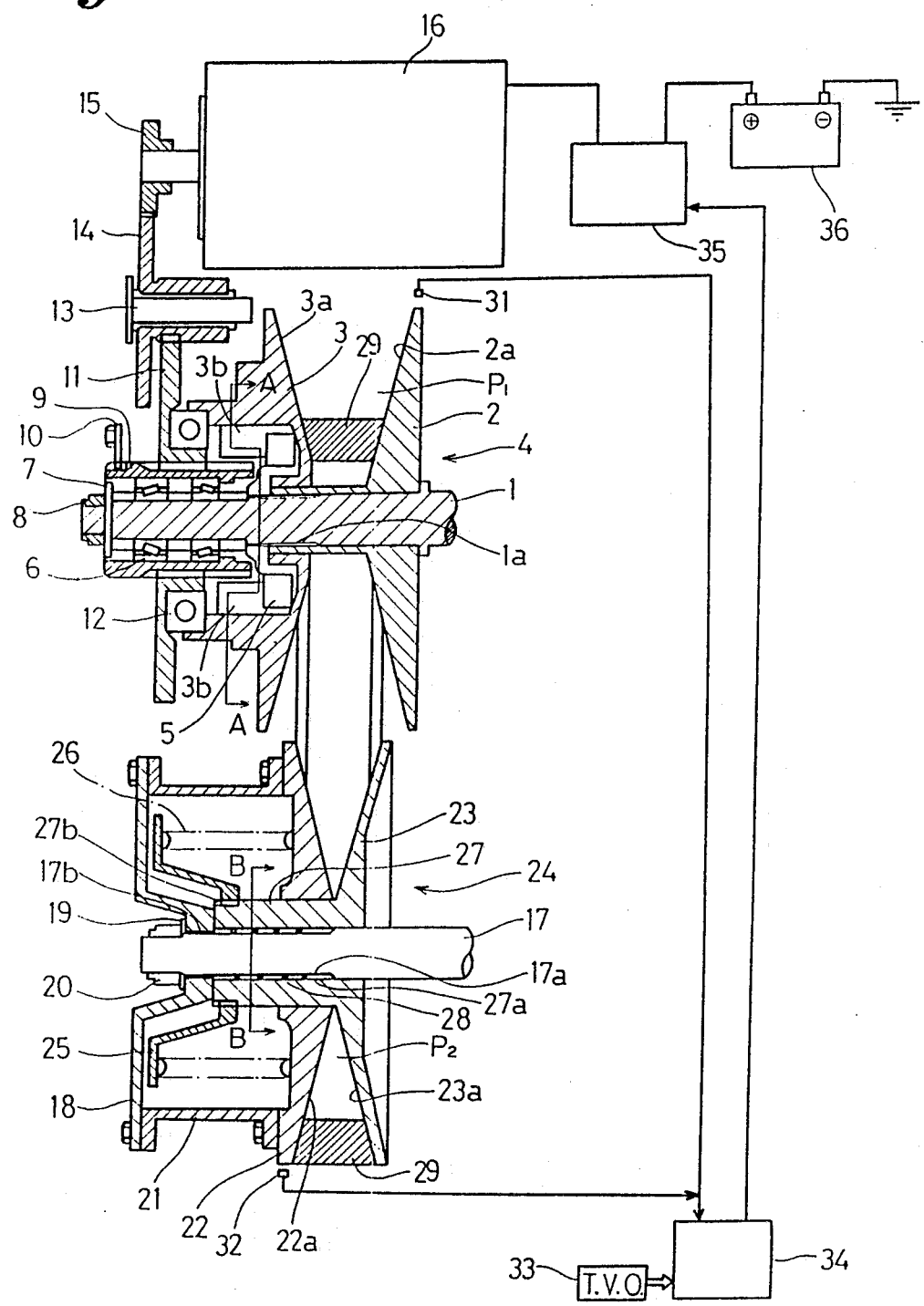
FIG. 1 is a longitudinal sectional view illustrating an embodiment of first through third inventions.

A first embodiment of the invention will be described referring to FIGS. 1~3.

In the figures, a driving shaft 1 is driven by an engine, and a driving stationary half pulley 2 having a conical surface 2a is fixed on the axis of the driving shaft 1.

A driving movable half pulley 3 having a conical surface 3a similar to the conical surface 2a of the driving stationary half pulley 2 is fixed on the driving shaft 1 so that the driving movable half pulley 3 is opposed to the driving stationary half pulley 2 and movable in the axial direction of the driving shaft 1.

An input pulley 4 is constituted by a pair of the driving stationary half pulley 2 and the driving movable half pulley 3, and a V-groove P1 is formed by each of the conical surfaces 2a and 3a and a V-belt 29 is hung in the V-groove P1.

Figure 2:
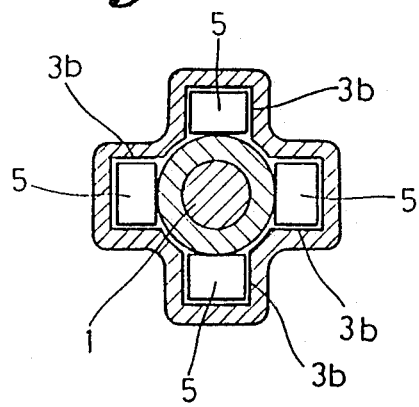
FIG. 2 is a sectional view taken on line A—A of FIG. 1.

At the rear side of the conical surface 3a of the driving movable half pulley 3, as shown in FIG. 2, a cam follower 5 fitted to a spline 1a formed on the driving shaft 1 is fixed on the driving shaft 1, and top end portion of the cam follower 5 is inserted in a groove 3b formed on the driving movable half pulley 3 and the rotating force of the driving shaft 1 is transmitted through the cam follower 5 to the driving movable half pulley 3.

The driving movable half pulley 3 is guided through its groove 3b by the cam follower 5 and can be moved in the axial direction of the driving shaft 1.

A bearing 6 is fitted on the outer circumference of the driving shaft 1 at the opposite side to the conical surface 3a of the driving movable half pulley 3, and fixed to the axial end of the driving shaft 1 through a washer 7 and a nut 8.

A cylindrical slider shaft 9 is externally fitted to the outer circumference of the bearing 6, and fixed to the case side by a stopper plate 10.

A male screw is formed on the outer circumferential surface of the slider shaft 9, and a slider gear 11 having a female screw threadedly engaged with the male screw of the slider shaft 9 on its inner circumferential surface is threadedly engaged on the slider shaft 9.

The slider 11 is stood in opposed state to the opposite side surface of the conical surface 3a of the driving movable half pulley 3, and abuts on the driving movable half pulley 3 through a slider bearing 12.

A gear is formed on the outer circumference of the slider gear 11 and meshed with an idler gear 14 on an idler shaft 13 rotatably installed to the case side. Further a drive gear 15 is meshed with the idler gear 14 and rotated by a motor 16.

On the other hand, a driven shaft 17 is installed in parallel to the driving shaft 1, and a side cover 18 is fixed on a spline 17a formed on the outer circumference of the driven shaft 17 at top end portion of the left side in the figure through a washer 19 and a nut 20.

End portion of a cylindrical adapter 21 is fixed in perpendicular direction to outer circumferential portion of the side cover 18 by a bolt. Other end portion of the adapter 21 is fixed on the opposite side surface to a conical surface 22a of a driven stationary half pulley 22 by a bolt.

A driven movable half pulley 23 is opposed to the driven stationary pulley 22 and has a conical surface 23a similar to that of the driven stationary half pulley 22. A cylindrical shaft 27 formed integral with the driven movable half pulley 23 is externally installed on the driven shaft 17 thereby the driven movable half pulley 23 is movable thereon. An output pulley 24 is constituted by a pair of the driven stationary half pulley 22 and the driven movable half pulley 23. As shown in FIG. 3, ball grooves 17a, 27a are formed respectively on the driven shaft 17 and the cylindrical shaft 27, and a ball 28 is interposed in the grooves 17a, 27a, thus the shafts 17, 27 are rotated synchronously through the ball 28 and slidable with each other. A V-groove P2 is formed by the conical surface 22a of the driven stationary half pulley 22 and the conical surface 23a of the driven movable half pulley 23.

The V-belt 29 is hung in the V-groove P2.

Further a plate 25 is fixed on the outer circumference of the driven movable half pulley 23 at the left end portion in the figure, and a spring 26 is interposed between the plate 25 and the opposite side surface to the conical surface 22a of the driven stationary half pulley 22 and both end portions of the spring 26 are fixedly installed.

In the V-belt type continuously movable transmission in such constitution, the engine is rotated thereby the driving shaft 1 is rotated, and the rotating torque is transmitted through the driving stationary half pulley 2 in fixed state and the cam follower 5 fixed to the driving shaft 1 to the driving movable half pulley 3. The input pulley 4 is rotated and further the rotating force is transmitted through the V-belt 29 to the output pulley 24.

In the output pulley 24, torque transmitted to the driven stationary half pulley 22 is transmitted through the adapter 21 to the side cover 18, and in turn through the side cover 18 to the driven shaft 17.

Figure 3:
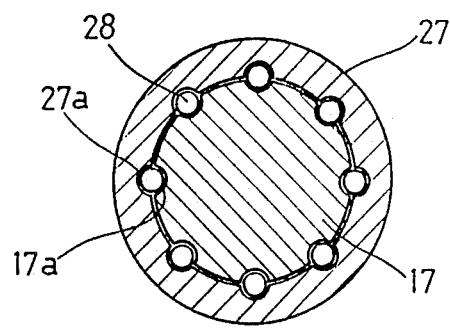
FIG. 3 is an enlarged sectional view taken on line B—B of FIG. 1.

On the other hand, torque transmitted to the driven movable half pulley 23 is transmitted through the ball grooves 17a, 27a and the ball 28 shown in the enlarged transverse sectional view of FIG. 3 to the driven shaft 17.

Next, at transmission state of the V-belt type continuously variable transmission, the motor 16 is driven thereby the drive force of the motor 16 is transmitted at speed reduction state through the driving gear 15 and the idler gear 14 to the slider gear 11.

According to rotation of the slider gear 11, the slider gear 11 is threadedly advanced in the rightward direction in the figure on the slider shaft 9 in fixed state.

Since the slider gear 11 is moved in the rightward direction in the figure through the screw, the driving movable half pulley 3 is pushed in the rightward direction in the figure through the slider bearing 12 thereby the pulley pitch diameter of the V-groove P1 is narrowed and the V-belt 29 is moved upward. Then at the output side, following this movement, the V-groove P2 is widened by action of the spring 26 and the V-belt 29 of the V-groove P2 is moved upward. Consequently, the output side becomes high-speed rotation.

On the other hand, when the motor 16 is rotated reversely, the slider gear 11 is rotated reversely through the driving gear 15 and the idler gear 14 and threadedly advanced in the leftward direction in the figure on the slider shaft 9. Consequently, the pushing force of the slider gear 11 to the driving movable half pulley 3 is released, and the V-belt 29 is moved in the leftward direction in the figure by action of the spring 26 at the output side. Consequently, the pitch diameter of the V-groove P1 is widened and the V-belt 29 is moved downward. Thereby the output side becomes low-speed rotation.

According to the invention, as above described, the slider gear is rotated by the drive source and the rotating force is converted into forward or rearward motion in the axial direction by the slider shaft, and the half pulley in the pulley is moved forward or rearward in the axial direction and distance between both half pulleys is adjusted thereby effective radius of the pulley is adjusted continuously. However, both of the pair of half pulleys may be moved forward or rearward by the slider gear.

A second embodiment will now be described referring to FIG. 1 and FIGS. 4~6. Numerals 31, 32 designate sensors to detect the rotating speed, and the sensor 31 detects the rotating speed of the input stationary half pulley 2 and the sensor 32 detects the rotating speed of the output stationary half pulley 22.

In the embodiment, magnetic sensors are used in the sensors 31, 32, and passing of magnets fixed respectively on the outer circumference of the input stationary half pulley 2 and the output stationary half pulley 22 by prescribed number (one in the embodiment) is detected thereby the rotating speed is detected.

Numeral 33 designates an accelerator opening position sensor for detecting the opening position of the accelerator. In the embodiment, the rotating angle is detected by a sensor installed in rotating portion of the accelerator or rotating portion of the throttle valve thereby the opening position of the accelerator is detected.

Figure 4:
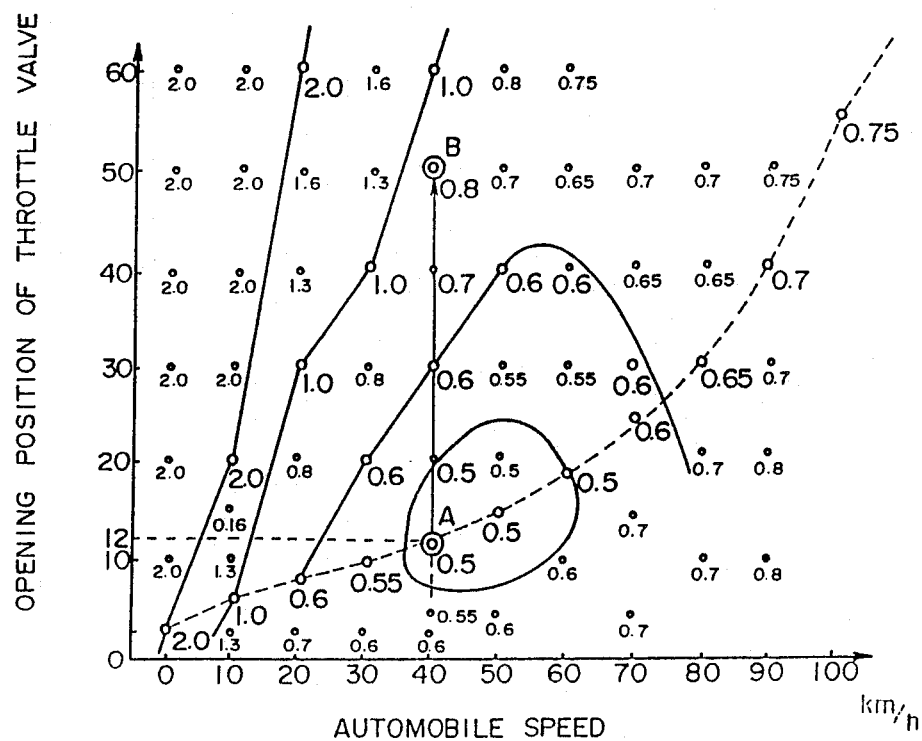
FIG. 4 is a diagram illustrating map estimating optimum gear ratio from automobile speed and opening position of throttle valve.
Figure 5:
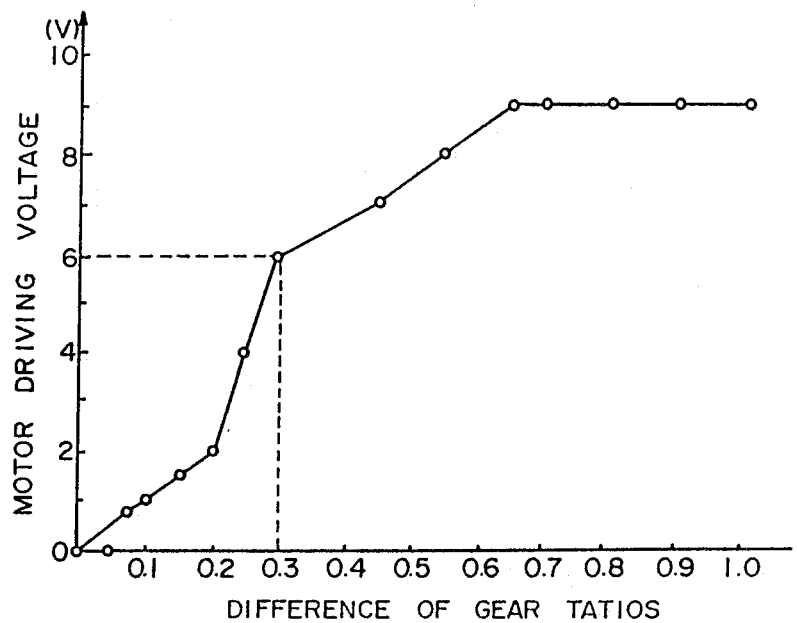
FIG. 5 is a diagram illustrating map estimating motor driving voltage from difference between actual gear ratio and indicated gear ratio.

Numeral 34 designates a control device, and a microcomputer constituted by ROM, RAM, CPU, I/O and the like is installed in the inside thereof. Signals from the sensors 31, 32 and the accelerator opening position sensor 33 are inputted to the I/O at the input side of the microcomputer. Also a motor driver 35 as hereinafter described is connected to the I/O at the output side. Maps shown in FIGS. 4 and 5 are stored in the inside of the ROM. These maps will be hereinafter described.

Numeral 35 designates a motor driver which is constituted by a transistor chopper in the embodiment. The motor driver 35 is controlled by signal from the control circuit 34, and prescribed voltage corresponding to the signal is applied to the motor 16. In the embodiment, a DC motor is used in the motor 16.

Numeral 36 designates a battery installed on the vehicle.

Subsequently, function and effect will be described.

Assume that the vehicle (not shown) travels at constant speed on a flat road at the throttle valve opening position of 12 degrees and the automobile speed of 40 km/h. Then the throttle valve opening position and the automobile speed are inputted respectively by the accelerator opening position sensor 33 and the sensor 32 to the control circuit 34.

From the data set in the ROM and the map shown in FIG. 4, the control circuit 34 calculates the command gear ratio 0.5 indicated by A corresponding to data of the automobile speed of 40 km/h and the throttle valve opening position of 12 degrees.

On the other hand, the control circuit 34 inputs data C1, C2 regarding the rotating speed of the input stationary half pulley 2 and the output stationary half pulley 22 from the sensors 31, 32, and calculates the actual gear ratio (C1/C2).

If the actual gear ratio also is 0.5, difference between the actual gear ratio and the command gear ratio becomes zero, thereby the control circuit 34 calculates the motor voltage 0 from the map within the ROM shown in FIG. 5 and commands the calculated voltage to the motor driver 35.

That is, since the motor voltage O means that any control to the motor is not done, the vehicle holds the gear ratio 0.5 and remains traveling.

If the accelerator is stepped on and the throttle is suddenly opened from 12 degrees into 50 degrees, the control circuit 34 detects this state by the accelerator opening position sensor 33, and calculates the command gear ratio 0.8 indicated by B from the map within the ROM shown in FIG. 4.

On the other hand, at the moment that the accelerator is stepped on, since the actual gear ratio remains 0.5 (The control circuit 34 always obtains the automobile speed and the actual gear ratio as data by signals from the sensors 31, 32.), the control circuit 34 calculates the difference 0.3 between the command gear ratio 0.8 and the actual gear ratio 0.5, and commands the motor driver 35 to generate the motor driving voltage 6 V from the map shown in FIG. 5 set within the ROM.

Figure 6:
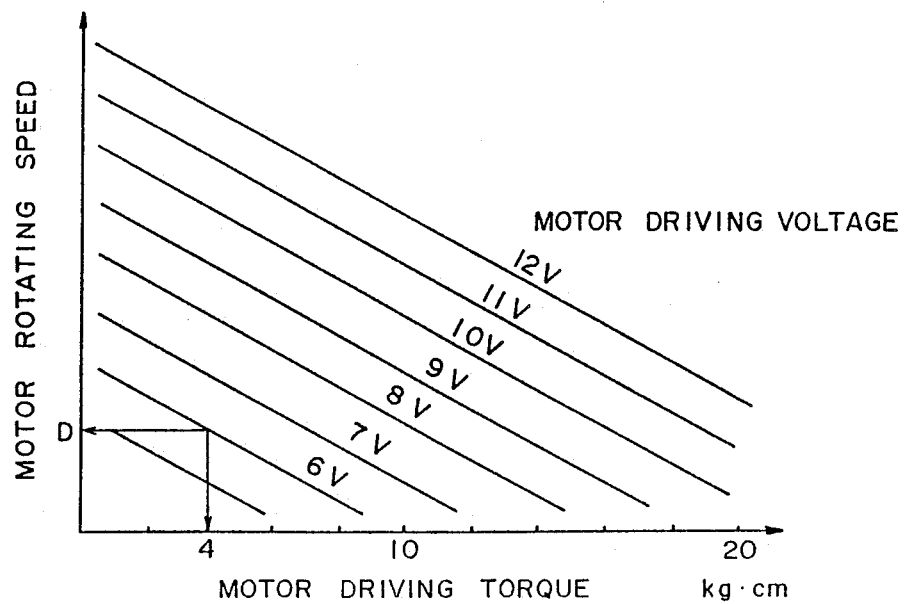
FIG. 6 is a motor characteristic diagram estimating motor rotating speed from motor driving voltage and motor driving torque.
Figure 7:
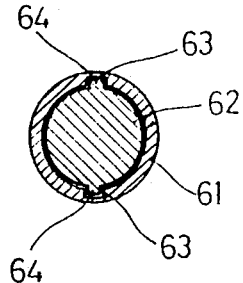
FIG. 7 is a transverse sectional view of a rotating force transmitting mechanism in the prior art.
Figure 8:
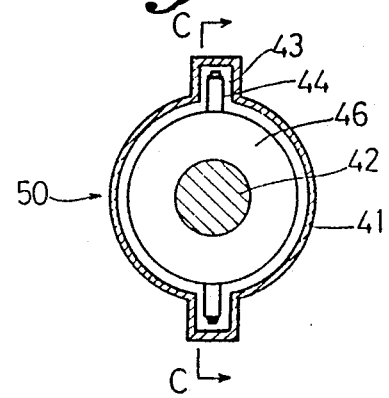
FIG. 8 is a transverse sectional view of an embodiment of fourth invention.
Figure 9:
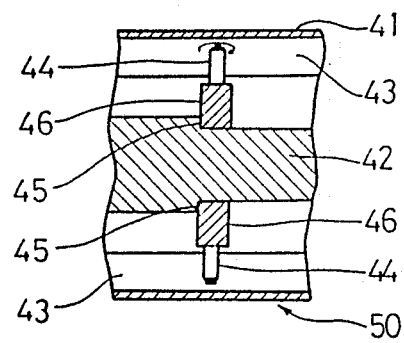
FIG. 9 is a sectional view taken on line C—C of FIG. 8.
Figure 10:
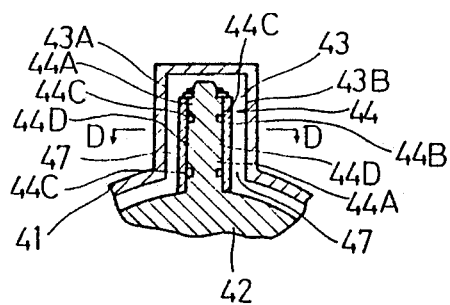
FIG. 10 is a fragmentary detailed sectional view of a key way and a key.
Figure 12:
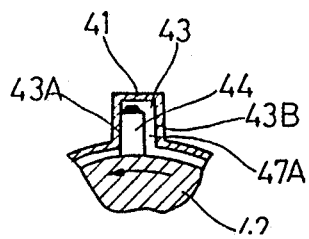
FIGS. 12 and 13 are fragmentary sectional views of a key way and a key in drive state.

Characteristics of the motor rotating speed to the motor driving voltage of the motor 16 in the embodiment are shown in FIG. 6. In the embodiment, since the torque required for the motor 16 to separate the V-belt 29 from the slant surface of the input pulley 4 is 4 kg.cm, the motor 16 is rotated at the rotating speed shown by D in FIG. 6 and moves the input movable half pulley 3 to the left in the figure. If the motor 16 is rotated (Then the rotating direction of the motor 16 is the rightward direction viewing from the left in the figure.), the rotation is transmitted by the driving gear 15 and the power transmitting gear 13 and the slider 11 is rotated in the rightward direction. If the slider 11 is rotated in the rightward direction, since the slider 11 is moved in the leftward direction by the worm action, the input movable half pulley 3 is moved in the leftward direction.

Since the moving speed of the input movable half pulley 3 is set by the above-mentioned control to such speed that the V-belt 29 can be moved without slip and without producing excessive tension, transmission is performed reasonably and the aimed command gear ratio can be rapidly attained. The control circuit 34 supervises whether the command gear ratio is attained or not by signals regarding the rotating speed from the sensors 31, 32. If it is sensed by the signal from the sensor that the command gear ratio is attained, the electric power supply to the motor 16 is interrupted and the rotation is stopped rapidly That is, the motor driving voltage obtained by the above-mentioned control and the rotating speed of the motor 16 (i.e., the speed of widening the distance between both half pulleys of the input pulley 4) obtained from the motor driving voltage are set so that when the tension of the V-belt 29 is decreased to degree not to produce the slip the speed is synchronized with (or slightly larger than) speed of narrowing the distance between both half pulleys of the output pulley 24 by the centrifugal force of the V-belt 29 and the force of the return spring 26. Consequently, the V-belt 29 is moved on the pulley surface of the input and output pulleys 4, 24 in the state that little tension is applied thereto, and the aimed command gear ratio can be attained rapidly.

Transmission is performed in holding the state of applying little tension to the V-belt 29 during transmission, and if the command gear ratio is attained the moving of the input movable half pulley 3 is stopped. Consequently, the tension is restored applying little shock to the V-belt 29 and the transmission is finished.

In the embodiment, although the case of shift-down has been mainly described, in the case of shift-up, the reverse control (reverse rotation of the motor 16) may be performed so at to attain the command gear ratio.

According to the second embodiment as above described, means for controlling the speed of widening the distance between both half pulleys of the input pulley to speed of naturally narrowing the radius of the V-belt at the input pulley side by the force of narrowing the distance between both half pulleys of the output pulley due to a spring and speed of naturally widening the V-belt due to centrifugal force is installed, thereby unreasonable tension does not act on the V-belt and transmission can be attained.

A third embodiment will now be described.

In the embodiment, a multiple thread screw is adopted in the male screw on the slider shaft 9 in FIG. 1, and a multiple thread screw is also adopted in the female screw of the inner circumferential surface of the slider gear 11 threadedly engaged with the male screw of the slider shaft 9. The embodiment has similar constitution to that in FIG. 1 except for the above description.

For example, when buttless thread is adopted in the male screw of the slider shaft 9 and the female screw of the slider gear 11 and a three-thread screw is formed, moving amount in the direction of the driving shaft 1 by one rotation of the slider gear 11, i.e., lead L is estimated from formula that $L = N \cdot P$. If the thread number N becomes three times, the lead L becomes three times in comparison to a one-thread screw in conventional case even if the pitch P is the same as that in conventional case thereby the moving amount of three times can be obtained.

However, deterioration of the axial force W in the case of the three-thread screw is estimated from formula that $$W = \frac{T}{R \tan(\theta + \phi)}$$

and calculation of the one-thread screw and the three-thread screw becomes $$\frac{W_3}{W_1} = \frac{\tan(\theta + \phi_3)}{\tan(\theta + \phi_1)}$$

and the axial force becomes 74% in the three-thread screw.

In the case of the three-thread screw, since the axial force is slightly deteriorated but the feed speed becomes three times from the formula that $L = N \cdot P$, even if the deterioration of the axial force is covered by increasing the reduction ratio by the driving gear 15 and the idler gear 14, the feed speed of 2.2 times can be obtained in comparison to the one-thread screw in conventional case by similar rotating torque.

Consequently, when the three-thread screw in the embodiment is adopted in the slider gear 11 and the slider shaft 9, even if the motor 16 similar to conventional case is used, the feed speed of the slider gear 11 to the slider shaft 9 can be securely made 2.2 times and corresponding to this the moving amount of the driving movable half pulley 3 is made high speed.

That is, in the embodiment, the three-thread screw is adopted in place of the one-thread screw in conventional case, and pitch of the thread is not changed and the slider gear 11 is rotated in holding the surface pressure of the screw to low value and by the driving torque force similar to conventional case, and moreover the feed speed of the slider gear 11 to the slider shaft 9 is increased, thereby the moving amount of the driving movable half pulley 3 is increased in comparison to conventional case and the opening and closing speed of the V-groove P1 becomes quite high. Consequently, the speed change time during transmission is reduced, and the acceleration feeling and speed change feeling at sudden braking or the like can be significantly improved.

In the embodiment, although the multiple thread screw is used in the slider gear 11 and the slider shaft 9 as the moving means of the movable half pulley 3 at the driving pulley side, on the contrary, the slider gear, the slider shaft, the motor, the idler gear or the like may be used in the moving means of the movable half pulley 23 at the driven pulley side and the multiple thread screw may be used in the slider gear and the slider shaft, thereby similar effect can be obtained. Also trapezoidal thread, round thread or the like may be adopted in the multiple thread screw.

A fourth embodiment will be described referring to FIGS. 9~15.

In a rotating force transmitting mechanism 50, an outer rotary shaft 41 is of cylindrical shape and an inner rotary shaft 42 is inserted in the outer rotary shaft 41 in relatively slidable state. A key way 43 in the axial direction is formed on the outer rotary shaft 41, and a stepped portion 45 with enlarged diameter is formed on the inner rotary shaft 42. A disk 46 to be locked to the stepped portion 45 is installed, and a key 44 being rotatable about axis perpendicular to the axial direction is projected from the disk 46 and fitted to the key way 43. The key 44, as shown in detail in FIG. 11, comprises a core 44A and a cylinder 44B, and an O-ring 44C is fitted to the core 44A and a grease box 44D is formed where grease is filled. Further, a small gap 47 is provided between the key way 43 and the key 44.

In the above-mentioned constitution, for example, if the inner rotary shaft 42 is made a driving shaft and the outer rotary shaft 41 is made a driven shaft and the inner rotary shaft 42 is rotated by the driving source, the rotating force is transmitted through the key 44 and the key way 43 to the outer rotary shaft 41. In this case, in rotation of arrow direction shown in FIG. 12 (leftward rotation), the key 44 abuts on a left wall 43A of the key way 43 and is spaced from a right wall 43B by the gap 47A. Consequently, even if the outer rotary shaft 41 and the inner rotary shaft 42 are relatively slided in synchronous rotating state, the cylinder 44B of the key 44 can be rotated. Since the cylinder 44B is significantly reduced in frictional resistance with the core 44A by the O-ring 44C and grease in the grease box 44D, it can be rotated with little resistance and therefore resistance for the relative slide between the outer rotary shaft and the inner rotary shaft 42 becomes quite small.

Figure 13:
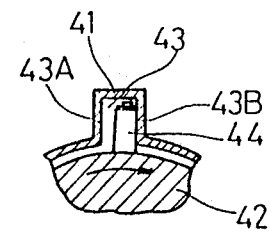
Figure 11:
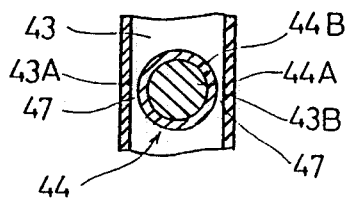
FIG. 11 is a sectional view taken on line D—D of FIG. 10.

In the case of rightward rotation shown in FIG. 13, the key 44 abuts on the right wall 43B of the key way 43, and in similar manner to leftward rotation, relative slide between the outer rotary shaft 41 and the inner rotary shaft 42 in synchronous rotating state is performed easily with quite small resistance.

Figure 14:
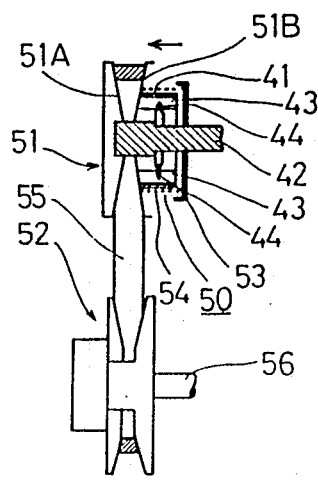
FIG. 14 is an explanation diagram of an application example.
Figure 15:
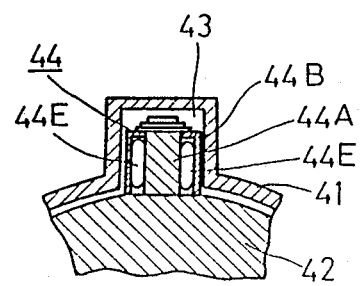
FIG. 15 is a fragmentary detailed sectional view of a key way and a key illustrating another embodiment.

The rotating force transmitting mechanism 50 in the invention can be applied to a stepless speed change mechanism in a power transmitting mechanism of vehicles as shown in FIG. 14. In the figure, numeral 51 designates a pulley to be opened or closed, and its inner surface is composed of a half pulley 51A and a half pulley 51B in taper shape. The half pulley 51A is mounted on the inner rotary shaft 42 of the rotating force transmitting mechanism 50, and the half pulley 51B is mounted on the outer rotary shaft 41 and further biased to arrow direction in FIG. 14 (closing direction) by a spring 54 from a disk 53 mounted on the inner rotary shaft 42. The pulley 51 is connected to a pulley 52 through a belt 55.

In the above-mentioned constitution, if the inner rotary shaft 42 is made a driving shaft, the rotating force of the inner rotary shaft 42 is transmitted through the key 44 and the key way 43 to the outer rotary shaft 41 in similar manner to the above description, and moreover the half pulley 51B is rotated in synchronization with the half pulley 51A. The rotating force of the pulley 51 is transmitted through the belt 55 to the pulley 52, and a shaft 56 of the pulley 52 becomes a driven shaft. In this case, if the belt 55 pushes the half pulley 51B in reverse arrow direction and falls by wedge effect of the taper-shaped inner surface against the biasing of the spring 54 of the half pulley 51B, effective radius of the pulley 51 becomes small and the rotating speed ratio between the pulley 51 and the pulley 52 becomes small. On the contrary, if the belt 55 rises, effective radius of the pulley 51 becomes large and the rotating speed ratio between the pulley 51 and the pulley 52 becomes large. Thus the rotating speed of the pulley 52 can be adjusted steplessly.

The invention is not limited by the embodiment but, for example, the key may be installed on the outer rotary shaft and the key way may be installed on the inner rotary shaft.

Also, for example, a needle-shaped roller 44E may be interposed between the core 44A and the cylinder 44B. In this constitution, frictional resistance between the core 44A and the cylinder 44B becomes small and the slide resistance of the key 44 further becomes small in comparison to the above embodiment.

What is claimed is:
1. A continuously variable transmission comprising:
a driving pulley and a driven pulley each having a stationary half pulley which is provided with a conical surface and is fixed to a driving shaft or a driven shaft, and a moveable half pulley having a conical surface substantially the same with said conical surface of said stationary half pulley so as to form V groove between said stationary hair pulley,
said moveable half pulley being slidably mounted to said driving shaft or said driven shaft so as to move away from and toward said stationary half pulley;
drive means for moving said moveable half pulley of said driving pulley or said driven pulley along said driving shaft;
an endless belt being passed between said driving pulley and said driven in engagement with each of said V grooves;
said drive means including a fixed slider shaft coaxially surrounding said driving shaft at the side opposite to said conical surface of said moveable half pulley and including a male thread on the outer surface thereof;
a slider mounted to said moveable half pulley through a bearing at the side opposite to said conical surface and including a female thread on the inner surface thereof for engagement with said male thread of said slider shaft;
a DC motor for rotation of said slider gear;
a control system for controlling said Dc motor;
said control system determining command gear ratio of said driving shaft to said driven shaft through a data map based on the automobile speed and the throttle valve opening position of an automobile engine detected by corresponding sensors, calcu- lating actual gear ratio of said driving shaft to said driven shaft from their actual rotating speed, calculating the difference between said actual gear ratio and said command gear ratio, and determining appropriate voltage to be applied to said DC motor through said data map based on said difference of ratio; whereby said DC motor rotates at the speed corresponding to said determined voltage, said slider moves in the axial direction on said slider shaft at an appropriate speed, and consequently, said moveable half pulley moves also at the appropriate speed away from and toward said stationary half pulley, so that an effective tension does not act on said endless belt.

2. Continuously variable transmission as set forth in claim 1 wherein said slider shaft and said slider are threadably engaged with each other through multiple thread engagement.

3. A continuously variable transmission comprising:
a driving pulley and a driven pulley each having a stationary half pulley which is provided with a conical surface and is fixed to a driving shaft or a driven shaft; a moveable half pulley having a conical surface substantially the same with said conical surface of said stationary half pulley so as to form V groove between said stationary half pulley; said moveable half pulley being slidably mounted to said driving shaft or said driven shaft so as to move away from and towards said stationary half pulley; drive means for moving said moveable half pulley of said driving pulley or said driven pulley along said driving shaft;
an endless belt being passed between said driving pulley and said driven pulley and in engagement with each of said V grooves;
said driven means including a fixed slider shaft coaxially surrounding said driving shaft at the side opposite to said conical surface of said moveable half pulley and including a male thread on the outer surface thereof;
a slider being mounted to said moveable half pulley through a bearing at the side opposite to said conical surface and including a female thread on the inner surface thereof for engagement with said male thread of said slider shaft;
a DC motor for rotating said slider gear;
and a control system for controlling said DC motor including means for determining command gear ratio of said driving shaft to said driven shaft through a data map based on the speed of the automobile and the throttle valve opening position of the automobile engine, means for calculating actual gear ratio of said driving shaft to said driven shaft from their actual rotating speeds, means for calculating the difference between said actual gear ratio and said command gear ratio, and means for determining appropriate voltage to be applied to said DC motor through said data map based on said difference ratio, whereby said DC motor rotates at a speed corresponding to said determined voltage, said slider moves in the axial direction on said slider shaft at an appropriate speed away and said moveable half pulley moves also at the appropriate speed from and towards said stationary half pulley so that unreasonable tension does not act upon said endless belt.

4. The continuously variable transmission as set forth in claim 3 wherein said slider shaft and said slider are threadably engaged with each other through multiple thread engagement.

* * * * *